United States Patent [19]
Streitman

[11] Patent Number: 6,142,062
[45] Date of Patent: Nov. 7, 2000

[54] DIAPHRAGM WITH MODIFIED INSERT

[75] Inventor: Lawrence R. Streitman, Pittsburgh, Pa.

[73] Assignee: Westinghouse Air Brake Company, Wilmerding, Pa.

[21] Appl. No.: 09/229,429

[22] Filed: Jan. 13, 1999

[51] Int. Cl.$^7$ .......................................................... F16J 3/00
[52] U.S. Cl. .......................... 92/99; 92/103 F; 92/103 SD
[58] Field of Search ...................... 92/99, 103 F, 103 SD, 92/98 R, 98 D, 96; 417/413

[56] References Cited

U.S. PATENT DOCUMENTS 4,295,631  10/1981  Allen .......................................... 251/30
5,836,571  11/1998  Streitman et al. ....................... 251/331

Primary Examiner—Edward K. Look
Assistant Examiner—Thomas E. Lazo
Attorney, Agent, or Firm—James Ray & Associates

[57] ABSTRACT

The present invention provides a diaphragm member for use in certain valve assemblies. Such diaphragm member comprises a generally circular diaphragm having a first predetermined diameter and having a first surface and a second surface. Such generally circular diaphragm is formed from at least one layer of a preselected elastomeric material. Such generally circular diaphragm includes a nonflexing center portion, a generally annular flexure portion extending around an outer periphery of such nonflexing center portion and a non flexing outer portion extending around an outer periphery of such generally annular flexure portion, such non flexing outer portion is engageable with a body portion of such valve assembly. Such diaphragm member further includes a generally circular insert member, having a second predetermined diameter, disposed within the first surface of such nonflexing center portion of such generally circular diaphragm. Such generally circular insert member has a plurality of apertures formed through such generally circular insert member, such plurality of apertures provide a predetermined open area for receiving a predetermined rubber compound for bonding such generally circular insert member to such nonflexing center portion of such generally circular diaphragm.

11 Claims, 3 Drawing Sheets

DIAPHRAGM WITH MODIFIED INSERT

FIELD OF THE INVENTION

The present invention relates, in general, to a diaphragm used in valves and, more particularly, the present invention relates to a diaphragm with a modified insert for use in limiting valves in railway control valves.

BACKGROUND OF THE INVENTION

Control valves are an integral part of most railway freight cars. The control valve operates to control the flow of air to and from the brake cylinders and to charge the auxiliary and emergency reservoirs. An important part of such control valves are limiting valves.

The service portion of such control valves contains two brake cylinder limiting valves which function to limit the maximum pressure directed to the brake cylinder application pipe or brake cylinder relay valve control pipe during service or emergency brake applications. The limiting valves are designated as the "Service Limiting Valve" and the "Emergency Limiting Valve". The maximum pressure output from these limiting valves is predetermined by load settings on the springs within each valve.

Such limiting valves rely on diaphragms to perform their function. A metal insert is mounted on such diaphragms and is held in place by the use of an adhesive. One problem with the present technology is that the diaphragm tends to delaminate at the periphery of the metallic insert because this is a stress concentration point which leads to delamination as the diaphragm flexes during operation. When delamination occurs, the diaphragm becomes inoperable and must be replaced before the limiting valve can operate properly again. Occurrences of this type are considered premature failure of the diaphragm and result in down time and further expense for the railroad. Thus, any improvement to the diaphragm that will eliminate premature failure and extend the useful service life of the diaphragm is desirable.

SUMMARY OF THE INVENTION

The present invention provides a diaphragm member for use in certain valve assemblies. Such diaphragm member comprises a generally circular diaphragm having a first predetermined diameter and having a first surface and a second surface. Such generally circular diaphragm is formed from at least one layer of a preselected elastomeric material. Such generally circular diaphragm includes a nonflexing center portion, a generally annular flexure portion extending around an outer periphery of such nonflexing center portion and a non flexing outer portion extending around an outer periphery of such generally annular flexure portion, such non flexing outer portion is engageable with a body portion of such valve assembly. Such diaphragm member further includes a generally circular insert member, having a second predetermined diameter, disposed within the first surface of such nonflexing center portion of such generally circular diaphragm. Such generally circular insert member has a plurality of apertures formed through such generally circular insert member, such plurality of apertures provide a predetermined open area for receiving a predetermined rubber compound for bonding such generally circular insert member to such nonflexing center portion of such generally circular diaphragm.

OBJECTS OF THE INVENTION

Therefore, it is one of the primary objects of the present invention to provide a diaphragm for such limiting valves that will have longer service life.

It is an additional object of the present invention to provide a diaphragm that will not delaminate.

Another object of the present invention is to provide a diaphragm in which the insert is molded to the diaphragm.

Still another object of the present invention is to provide an insert for such diaphragm that will permit such insert to be molded and retained in such diaphragm.

Yet another object of the present invention is to modify the profile of the diaphragm so as to reduce stress points on the diaphragm.

In addition to the numerous objects and advantages of the present invention which have been described with some degree of particularity above, it should be both noted and understood that a number of other important objects and advantages of the diaphragm with a modified insert will become more readily apparent to those persons who are skilled in the relevant diaphragm art from the following more detailed description of the invention, particularly, when such detailed description is taken in conjunction with the attached drawing FIGS. and with the appended claims.

Figure 1:
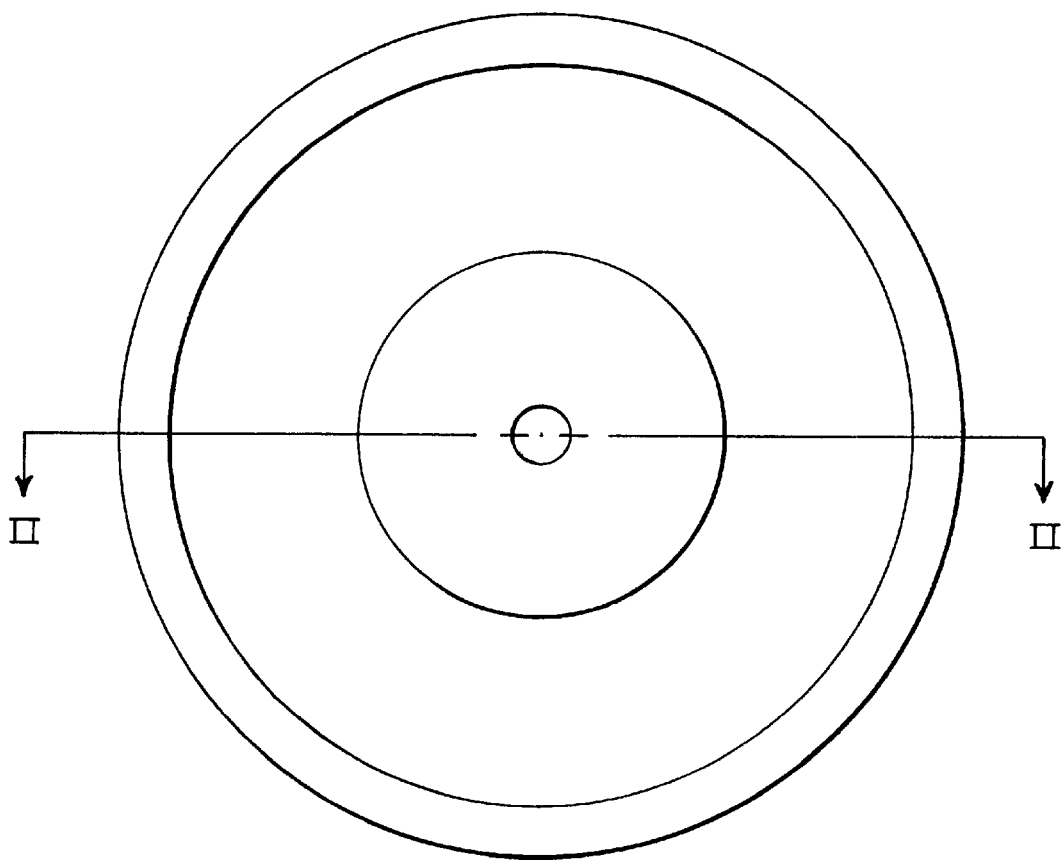
FIG. 1 is a plan view of a prior art diaphragm with an insert.

BRIEF DESCRIPTION OF THE PRESENTLY PREFERRED AND VARIOUS ALTERNATE EMBODIMENTS OF THE INVENTION

Prior to proceeding to the more detailed description of the various embodiments of the invention, it should be noted that, for both the sake of clarity and understanding of the improved resilient type sealing member according to the present invention, identical components which have identical functions have been identified with identical reference numerals throughout the several views which have been illustrated in the attached drawing FIGS.

Figure 2:
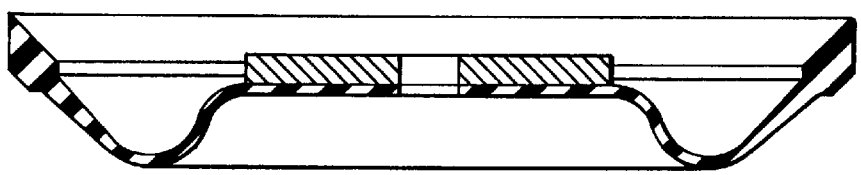
FIG. 2 is a cross-sectional view taken across the lines II—II of the prior art diaphragm with an insert shown in FIG. 1.

Reference is now made to FIGS. 1 and 2. Illustrated therein is a prior art diaphragm with an insert as is presently used in the industry.

Figure 3:
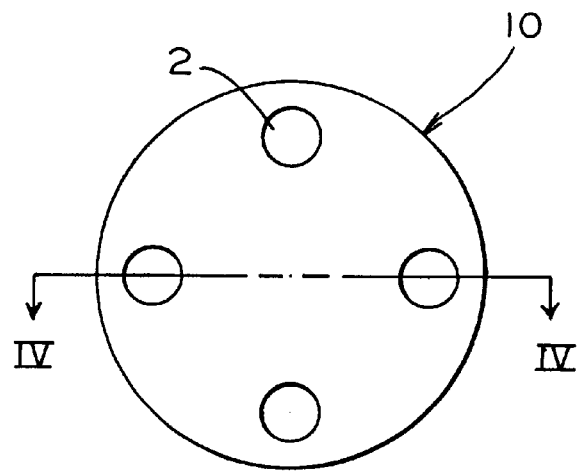
FIG. 3 is a plan view of a modified insert in an embodiment of the invention.
Figure 4:
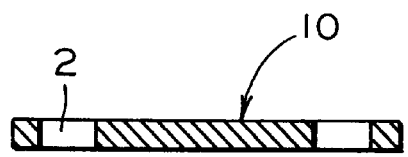
FIG. 4 is a cross-sectional view of the insert shown in FIG. 3 taken across the lines IV—IV.
Figure 5:
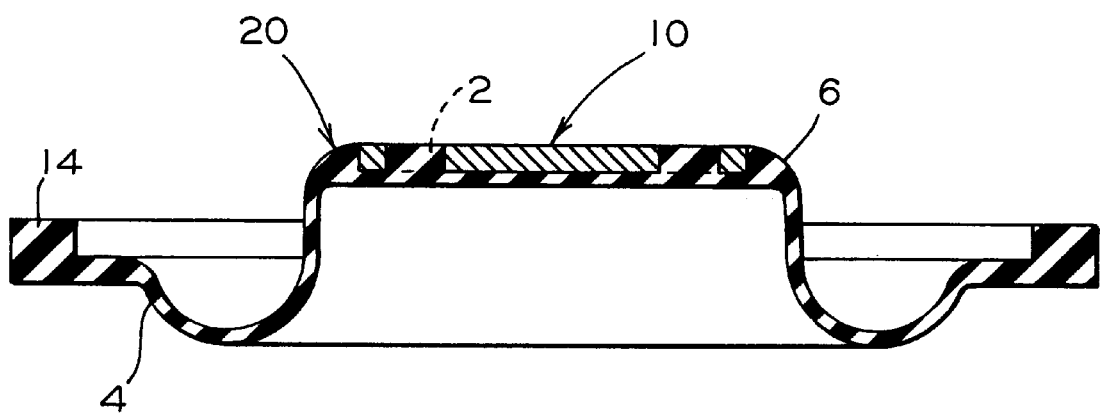
FIG. 5 is a cross-sectional view of the diaphragm with a modified insert in an embodiment of the invention.

Reference is now made to FIGS. 3, 4 and 5. Illustrated therein are various views of such modified generally circular insert, generally designated 10. Also shown is such diaphragm member, generally designated 20, with such modified generally circular insert 10 disposed therein.

As is evident, insert 10 has a plurality of apertures 2 formed through such insert 10. In a presently preferred embodiment of the invention such plurality of apertures 2 is four. Also in the presently preferred embodiment of the invention such apertures are all positioned near the outer periphery of such generally circular insert 10. Two of such apertures are placed on a horizontal axis of such generally circular insert 10, while the other two apertures 2 in the presently preferred embodiment are placed on the longitudinal axis, near the outer periphery of such insert 10. Such apertures are placed generally equidistant from such outer periphery.

The generally circular insert 10 can be seen disposed within diaphragm 4 to form the complete diaphragm member 20 in Drawing FIG. 5. Evident in FIG. 5 is also a profile change 6 made in such diaphragm 4 where the diaphragm meets such insert 10. In prior art diaphragms this is the stress concentration point which led to delamination where the rubber diaphragm bonded to the insert edge. Such profile change 6 permits the rubber to be bonded up to the top of the insert 10 thereby reducing stress concentration at the edge of insert 10 during flex cycling in application of the valve. The flexure portion of such diaphragm member 20 is the portion between such profile change 6 and the outer periphery 14 which is secured by the body of a valve.

The modification in insert 10 permits insert 10 to be registered in the molding process to allow for producing the profile change 6. In the preferred embodiment of the invention such insert would be molded directly into diaphragm 4 to form such diaphragm member 20. The insert is made from a metal or metallic alloy such as brass and the diaphragm 4 can be made from a pre-selected elastomeric such as rubber, synthetic rubber or plastic that is reinforced with a fabric such as nylon.

Figure 6:
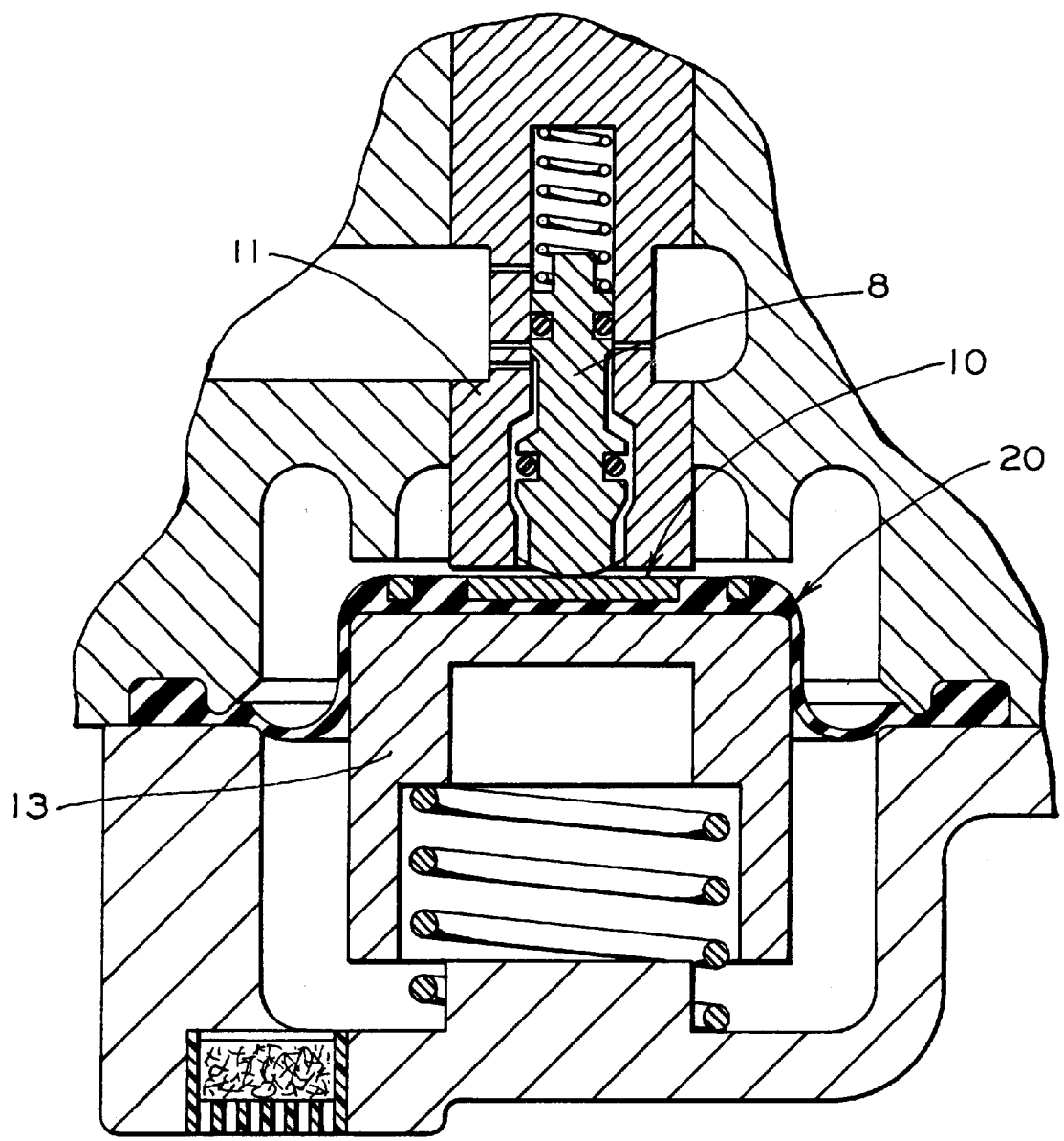
FIG. 6 is a cross-sectional view of the diaphragm with a modified insert of the present invention shown in a limiting valve.

Although not limited to such use, the present invention has been designed for use in the limiting valve portion of service control valves on railway rolling stock. FIG. 6 shows the application of such diaphragm member 20 in one such limiting valve. Such limiting valve stem 8 passes through the valve bushing 11 to contact the generally circular insert 10 of diaphragm 20 to push on diaphragm follower 13. The outer periphery 14 of such diaphragm member 20 is secured by body portions of such limiting valve. Valve stem 8 pushes on diaphragm 20 causing it to move downward until the preload of the spring causes such diaphragm follower 13 to push back upward. This flexing of the flexure portion of such diaphragm 20 places considerable strain on the portion of the diaphragm that abuts the generally circular insert 10. It is this place that premature delamination in prior art diaphragms occurs. With the present invention, not only is the generally circular insert more firmly embedded in the diaphragm to be better able to absorb the stress forces but the profile change 6 reduces such stress concentration even more and thus the service life of such diaphragm 20 is extended considerably.

While a presently preferred and an alternative embodiment of the present invention have been described in detail above, it should be understood that various other adaptations and/or modifications of the present invention can be made by those persons who are particularly skilled in the art related to diaphragms and, more particularly, diaphragms used in such valve systems without departing from either the spirit of the invention or the scope of the appended claims.

I claim:

1. A diaphragm member for use in certain valve assemblies, said diaphragm member comprising:
    (a) a generally circular diaphragm having a first predetermined diameter and having a first surface and a second surface, said generally circular diaphragm formed from at least one layer of a preselected elastomeric material, said generally circular diaphragm including:
        (i) a nonflexing center portion,
        (ii) a generally annular flexure portion extending around an outer periphery of said nonflexing center portion, and
        (iii) an outer portion extending around an outer periphery of said generally annular flexure portion engageable with and a body portion of such valve assembly; and
    (b) a generally circular, nonflexible insert member, having a second predetermined diameter, disposed within said first surface of said nonflexing center portion of said generally circular diaphragm, said generally circular insert member having a plurality of apertures formed through said generally circular insert member, said plurality of apertures providing a predetermined open area for receiving said preselected elastomeric material for bonding said generally circular, nonflexible insert member to said nonflexing center portion of said generally circular diaphragm.

2. A diaphragm member for use in certain valve assemblies, according to claim 1, wherein said plurality of apertures in said generally circular insert being disposed closely adjacent an outer periphery.

3. A diaphragm member for use in certain valve assemblies, according to claim 1, wherein said plurality of apertures in said generally circular insert being disposed on an axis that is concentric to said outer periphery.

4. A diaphragm member for use in certain valve assemblies, according to claim 3, wherein said plurality of apertures in said generally circular insert being spaced generally equidistant from each other.

5. A diaphragm member for use in certain valve assemblies, according to claim 1, wherein said plurality of apertures in said generally circular insert is four.

6. A diaphragm member for use in certain valve assemblies, according to claim 1, wherein said generally circular insert is molded within said diaphragm.

7. A diaphragm member for use in certain valve assemblies, according to claim 1, wherein said generally circular insert is one of a metal and a metallic alloy.

8. A diaphragm member for use in certain valve assemblies, according to claim 7, wherein said generally circular insert is brass.

9. A diaphragm member for use in certain valve assemblies, according to claim 1, wherein said preselected elastomeric material is selected from rubber, synthetic rubber and plastics.

10. A diaphragm member for use in certain valve assemblies, according to claim 9, wherein said preselected elastomeric material further includes fabric reinforcement.

11. A diaphragm member for use in certain valve assemblies, according to claim 10, wherein said fabric reinforcement is nylon.

* * * * *